April 16, 1968  C. L. RINGQUIST ET AL  3,378,062
FOUR PIPE HEAT PUMP APPARATUS

Filed Oct. 27, 1966  3 Sheets-Sheet 1

INVENTORS
CLARENCE L. RINGQUIST
JOHN W. LORENZ
BY Malcolm L. Moore
ATTORNEY

April 16, 1968   C. L. RINGQUIST ET AL   3,378,062
FOUR PIPE HEAT PUMP APPARATUS Filed Oct. 27, 1966   3 Sheets-Sheet 3

INVENTORS
CLARENCE L. RINGQUIST
JOHN W. LORENZ
BY Malcolm L. Moore
ATTORNEY

United States Patent Office 3,378,062
Patented Apr. 16, 1968

3,378,062
FOUR PIPE HEAT PUMP APPARATUS
Clarence L. Ringquist and John W. Lorenz, La Crosse, Wis., assignors to The Trane Company, La Crosse, Wis., a corporation of Wisconsin
Filed Oct. 27, 1966, Ser. No. 589,968
10 Claims. (Cl. 165—22)

ABSTRACT OF THE DISCLOSURE

Heating and cooling systems having a compression refrigeration machine, a heating fluid circuit including an air heater and the condenser of the refrigeration machine, a cooling fluid circuit including an air cooler and the evaporator of the refrigeration machine, a heat exchanger exposed to outdoor air and valves for connecting the heat exchanger in the heating circuit when the system requires the disposal of heat to the outdoor air and for connecting the heat exchanger in the cooling circuit when the system requires heat from the outdoor air.

---

This invention relates to air conditioning apparatus capable of simultaneously providing heating and cooling in a plurality of zones to be conditioned. The apparatus of this invention is so arranged and controlled that each zone of a multi-zone air conditioning load may be heated or cooled at any season of the year.

Among the known schemes for heating and cooling a plurality of zones or rooms is the four pipe system which incorporates a boiler or heat source and a water chiller in separate heating and cooling piping circuits. Each of these circuits normally includes supply and return lines leading to and from heating and cooling coils located in each zone. It is also known to utilize the heat rejected in the condenser of a compression refrigeration system as a source of heat in a heat pump arrangement.

Our invention is particularly distinguished by the incorporation of a central compression refrigeration plant in a four pipe heating and cooling system of the aforesaid type in a unique manner which permits the heat exchanger which normally dissipates the heat rejected by a water cooled refrigerant condenser to serve alternately as a heat source and heat sink. In our improved heating and cooling system, the refrigerant condenser is utilized to heat water circulated through a heating coil in each zone and the refrigerant evaporator serves to chill water pumped to separate cooling coils in each zone. A heat exchanger, for example an evaporative cooler, exposed to outdoor air, is provided with piping and valve means whereby it may be connected in fluid flow relationship with either the water-cooled refrigerant condenser or the evaporator. By virtue of this arrangement, the heat exchanger exposed to outdoor air operates to cool the condenser water in the summer or cooling season when there is little or no heating load to absorb the condenser water heat and to heat the chilled water circulated from the refrigerant evaporator in the winter when there is no cooling load to serve this purpose.

The heating and cooling piping circuits of the above described air conditioning apparatus are so designed as to provide heating and cooling at all zones at all times. This desirable feature is advantageously combined with a heat pump arrangement in which the refrigerant flow path through the evaporator and condenser remains the same during all seasons of the year. The problems which normally attend reversal of the refrigeration cycle for heat pump operation are thus eliminated.

Another feature of this invention resides in the incorporation of an auxiliary heater in a bypass pipe around the aforementioned outdoor heat exchanger, the flow of chilled water through said auxiliary heater being proportionally increased by automatic control means as the outdoor temperature drops to a level insufficient to maintain an adequate heat load on the evaporator of the refrigeration plant.

A further advantageous feature of this invention is a form of automatic control incorporating separate temperature sensors in the heating fluid and cooling fluid piping circuits operative to actuate valves in each of these circuits so as to direct either the heating fluid or the cooling fluid through the outdoor heat exchanger dependent upon the dominance of the heating or cooling demand in the zones to be air conditioned.

These and other features and advantages of our invention will become readily apparent as the following description is read in conjunction with the accompanying drawings of which:

Figure 1:
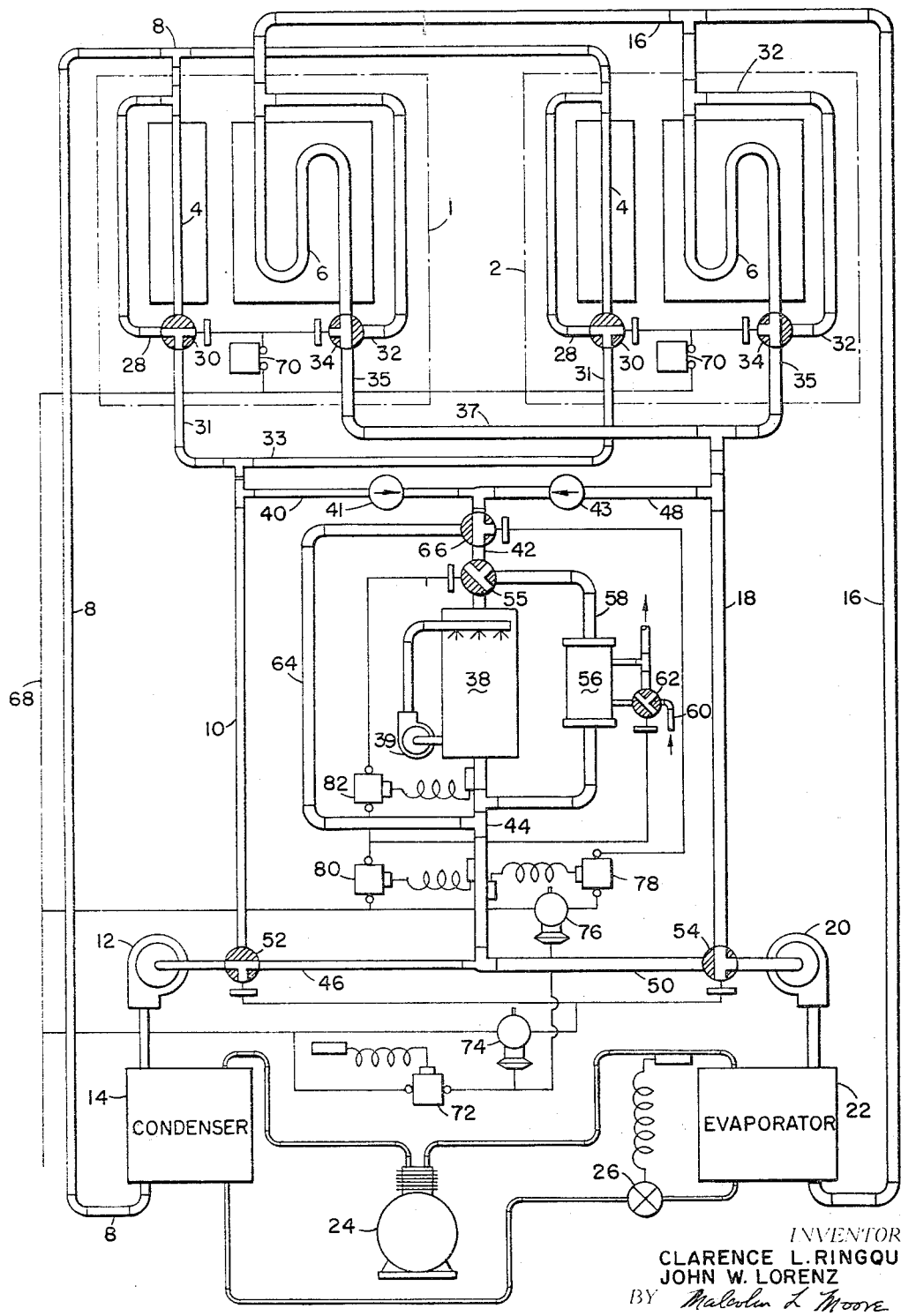
FIGURE 1 is a diagrammatic illustration of the basic heating and cooling apparatus of our invention.

With reference to FIGURE 1, the heating and cooling apparatus of our invention is particularly adapted to condition the air in a plurality of zones 1 and 2, which may be different portions or rooms of a building or a plurality of buildings. Two of such zones have been shown for illustrative convenience. Any number of zones may exist on installations in which our improved air conditioning apparatus is employed. The conditioning units in each zone consist of separate heating and cooling heat exchange coils 4 and 6 respectively. Each of the heating coils 4 is connected in a hot fluid piping circuit including supply pipe 8, return pipe 10, circulating pump 12 and heating means 14. In like manner, each of the cooling coils is connected in a cooling fluid piping circuit including supply pipe 16, return pipe 18, circulating pump 20 and chiller means 22. The heating and cooling means 14 and 22 constitute the condenser and evaporator respectively of a standard compression refrigeration plant. The refrigeration circuit consists of compressor 24, which may be of the centrifugal or reciprocating type, interconnected with condenser 14 and evaporator 22 in the manner shown. High temperature refrigerant gas discharged by compressor 24 is condensed at 14, thereby giving up its heat to the fluid circulated by pump 12. The condensed refrigerant then passes through expansion valve 26 to evaporator 22 where it chills the fluid circulated by pump 20 as it vaporizes. The refrigerant follows this same flow path at all times so as to continuously provide a heating source at condenser 14 and a cooling source at evaporator 22.

Each of the heating coils 4 in the conditioned spaces is provided with a bypass line 28 controlled by three-way valve 30 located at the coil outlet. Valves 30 are positioned by thermostatic means described below so as to direct the flow of heating fluid through or around heating coils 4 in accordance with the demand for heating in each zone. Each of the cooling coils 6 is provided with a similar flow control arrangement comprising bypass lines 32 and three-way valves 34. The outlet port of each of the three-way heating control valves 30 is connected to pipes 31 leading to a common pipe or header 33 to which return pipe 10 is connected. In the cooling circuit, pipe 37 directs the cooling fluid flowing from pipes 35 connected to the outlet ports of valves 34 to return pipe 18.

Illustrated diagrammatically in the center of FIGURE 1 is an evaporative cooler 38 and the associated piping and valve means which permit it to be connected in series flow with either heating coils 4 and condenser 14 of the heating circuit or cooling coils 6 and evaporator 22 of the cooling circuit. Evaporative cooler 38 is exposed to outdoor air, and functions as a heat exchanger to alternately cool the hot fluid circulating through the heating circuit and heat the chilled fluid flowing through the cooling circuit. To this end, pipes 40 and 46 connect inlet line 42 and outlet line 44 leading to and from evaporative cooler 38 with the return side of the heating fluid piping circuit. In a similar manner, pipes 48 and 50 connect evaporative cooler 38 with the return side of the cooling fluid piping circuit. Three-way valves 52 and 54 located in return pipes 10 and 18 respectively are of the two-position type, and direct the flow of the heating and cooling fluids either through or around evaporative cooler 38. Check valve 41 positioned in line 40 operates to prevent the flow of cooling fluid into the heating circuit when the cooling fluid is being circulated through evaporative cooler 38. Check valve 43 in line 48 serves the same purpose with respect to the flow of heating fluid.

A supplemental heater 56 is positioned in bypass conduit 58 in parallel with heat exchanger 38. Control valve 55 routes fluid from the cooling circuit through this heater in the winter time when the outside air temperature is too low to permit evaporative cooler 38 to serve adequately as a heat source for evaporator 22 of the refrigeration system. Heat exchanger 56 can be supplied with hot water, steam or electrical energy as the supplemental heat source. A hot water line 60 controlled by valve 62 is shown as the means for furnishing heat to heat exchanger 56, by way of example.

A second bypass conduit 64 serves to direct heating fluid around the evaporative cooler when the temperature of the fluid in the heating circuit leaving the evaporative cooler drops below a predetermined minimum level. Flow through bypass conduit 64 is regulated by three-way valve 66 at the inlet to evaporative cooler 38.

Since evaporative cooler 38 and the associated piping are exposed to outside air, care must be taken to prevent the freezing of the fluids circulated in the heating and cooling circuits. In climates where the temperature drops below freezing in the winter months, the fluids circulated should be a mixture of ethylene glycol and water or some type of brine which will not freeze. Where below-freezing temperatures will not be encountered, water may be used in both the heating and cooling piping circuits.

The controls for regulating the heating and cooling apparatus of our invention are also shown in FIGURE 1, and are actuated pneumatically by air drawn from a main air supply line 68. A thermostat 70 located in each zone to be conditioned actuates three-way valves 30 and 34 so as to direct the heating and cooling fluids through or around coils 4 and 6 in response to the demands of the conditioned spaces. As the temperature in zones 1 and 2 rises, thermostats 70 pass an increasing amount of air to the power elements of direct acting control valves 30 and 34. As the air pressure is increased, valves 30 bypass more and more of the heating fluid around coils 4 until the pressure reaches 8 p.s.i. At this point valves 30 will be in the position shown, bypassing all of the heating fluid around coils 4. If the temperature continues to rise, the air pressure delivered by thermostats 70 will also rise, and at an air pressure of 9 p.s.i. valves 34 will start directing cooling fluid through coils 6. At 13 p.s.i. valves 34 will be in the position shown in FIGURE 1, and all of the cooling fluid will be flowing through coils 6. On a drop in temperature, the cycle of operation of valves 30 and 34 would be reversed.

Since both warm fluid and cold fluid are available at all times from condenser-heater 14 and evaporator-chiller 22, it is possible to be passing heating fluid through coil 4 in one zone calling for heating while circulating cooling fluid through coil 6 of another zone requiring cooling. Heating fluid is continuously circulated by pump 12 through condenser 14 to coils 4 in each zone. The hot fluid is directed either through or around coil 4 by valves 30 and returns to pump 12 through either return pipe 10 or evaporative cooler 38. Cooling fluid is continuously circulated by pump 20, and after passing through or around coils 6, returns to pump 20 by way of return pipe 18 or evaporative cooler 38.

In order to determine the return paths taken by the circulating fluids en route to pumps 12 and 20, control valves 52 and 54 are selectively positioned for summer or winter operation by two-position thermostat 72, which has its sensing bulb exposed to outside temperatures. This action takes place by way of three-way control valve 74, which is actuated to admit air to the power elements of valves 52 and 54 when thermostat 72 senses a rise in outdoor temperature.

When changeover thermostat 72 switches the system from winter to summer operation, valves 52 and 54 will be actuated to the positions shown in FIGURE 1 so as to permit the hot fluid returning from zones 1 and 2 through pipes 31 and 33 to pass through evaporative cooler 38. At this time, it is possible that the water or other heating fluid will be cooled to an undesirably low temperature in evaporative cooler 38. To avoid this condition, changeover controller 72 is also arranged to actuate three-way air valve 76 to permit air to flow to thermostat 78 and thereby render said thermostat operative at the same time that valve 52 is positioned to direct fluid from the heating circuit through evaporative cooler 38. Thermostat 78 senses the temperature of the fluid leaving evaporative cooler 38 and operates valve 66 to bypass heating fluid around evaporative cooler 38 through conduit 64 if the temperature of the fluid returning to condenser 14 drops below a predetermined minimum level, e.g., 90° F.

Temperature controller 80 is positioned to sense the temperature in common discharge line 44 downstream of evaporative cooler 38 and heater 56. During the winter or heating season, controller 80 regulates valve 55 so as to direct more and more cooling fluid through supplemental heater 56 as the temperature of the cooling fluid in line 44 decreases to a predetermined minimum level, e.g., 45° F. Controller 80 simultaneously actuates valve 62 to increase the flow of hot water through heater 56 in an amount at least proportional to the rising flow of cooling fluid therethrough. In order to avoid a situation where some of the cooling fluid would be passing through the evaporative cooler 38 and being cooled (due to a low outdoor temperature) while the remaining portion thereof would be absorbing heat in heat exchanger 56, thus wasting heat, a limit controller 82 is located at the outlet of evaporative condenser 38. Controller 82 operates valve 55 to put all of the cooling fluid through heater 56 when the temperature of the fluid discharging from evaporative cooler 38 reaches a predetermined low level.

An additional controller (not shown) would normally be placed in the outdoor air and would be operative to shut off water circulating pump 39 of the evaporative cooler when the outdoor temperature drops below 40° F. This device would serve to prevent freeze-up of the spray water in the evaporative cooler.

The foregoing description of the control arrangement will render the operation of the heating and cooling apparatus readily apparent to those skilled in the art. The system operation may be briefly summarized as follows. During the summer, changeover controller 72 will sense a relatively high outdoor temperature and actuate air control valve 74 so as to permit the flow of pressurizing air to valves 52 and 54, thus causing them to be positioned as shown in FIGURE 1. The fluid in the heating circuit discharging from pump 12 will pass through condenser 14 where it absorbs the heat given up by the hot refrigerant gas in condensing to a liquid. The heated fluid then flows through supply pipe 8 to each of the conditioned zones, where it flows either through or around heating coils 4. Since the heating requirements will now be minimal, most of the heating fluid will bypass coils 4 en route through valves 30 to discharge lines 31 and pipe 33. Since the port of valve 52 connected to return pipe 10 is now closed, the heating fluid will flow through pipes 40 and 42 to evaporate cooler 38 where the balance of the heat of condensing will be dissipated. The cooled fluid then returns through pipes 44 and 46, valve 52 and pump 12 to condenser 14. At the same time, cooling fluid chilled in evaporator 22 will flow through supply pipe 16 to cooling coils 6 in each zone. The large demand for cooling in the summer as sensed by thermostats 70 will normally result in valves 34 being positioned as shown so as to direct the cooling fluid through coils 6. With valve 54 positioned as shown, the cooling fluid will pass from coils 6 through pipes 35, 37 and return pipe 18 directly back to pump 20.

During winter operation, changeover controller 72 will act on air valve 74 to shut off the flow of pressurizing air to valves 52 and 54 thereby reversing the position of these valves from that shown in FIGURE 1. The heating fluid supplied to each zone by pipe 8 will now flow through coils 4 where it will give up the condenser heat in order to satisfy the heating demand sensed by thermostats 70. With valve 52 now positioned to connect return pipe 10 with pump 12, the fluid leaving coils 4 will be routed via pipes 31, 33 and 10 directly back to condenser 14. Since there will be little or no cooling demand in zones 1 and 2 at this time, most of the cooling fluid supplied from evaporator 22 by pipe 16 will flow around coils 6 through bypass lines 32. From control valves 34, the cooling fluid will be directed by pipes 35, 37, 48 and 42 to heat exchanger 38. In the course of flowing through heat exchanger 38 the cooling fluid will be heated by the outside air before returning to pump 20 through pipes 44 and 50 and valve 54. Heat exchanger 38 thus serves as a heat source for the refrigeration system in the winter months when there is no cooling demand in the conditioned zones to place a load on evaporator 22. In the event that the outdoor air temperature becomes so low that the necessary heat cannot be picked up in heat exchanger 38, controllers 80 and 82 will regulate valves 55 and 62 so as to enable the cooling fluid to be heated by flowing through supplemental heater 56 in bypass conduit 58.

The problems and contingencies which must be provided for when relying upon outside air as a heat source in the winter months may be avoided by using city or well water as the heat exchange medium in exchanger 38. In such a case, exchanger 38 would be a simple two fluid heat exchanger rather than an evaporative cooler, and the city or well water would serve to absorb the condenser heat in the summer months and to give up heat to the chilled water of the cooling circuit in the winter. Temperature controllers responsive to the temperature at the outlet 44 of the heat exchanger would be employed to regulate the amount of city or well water put through the heat exchanger so as to maintain the temperature of the heating or cooling fluid leaving the heat exchanger at the desired level.

Figure 2:
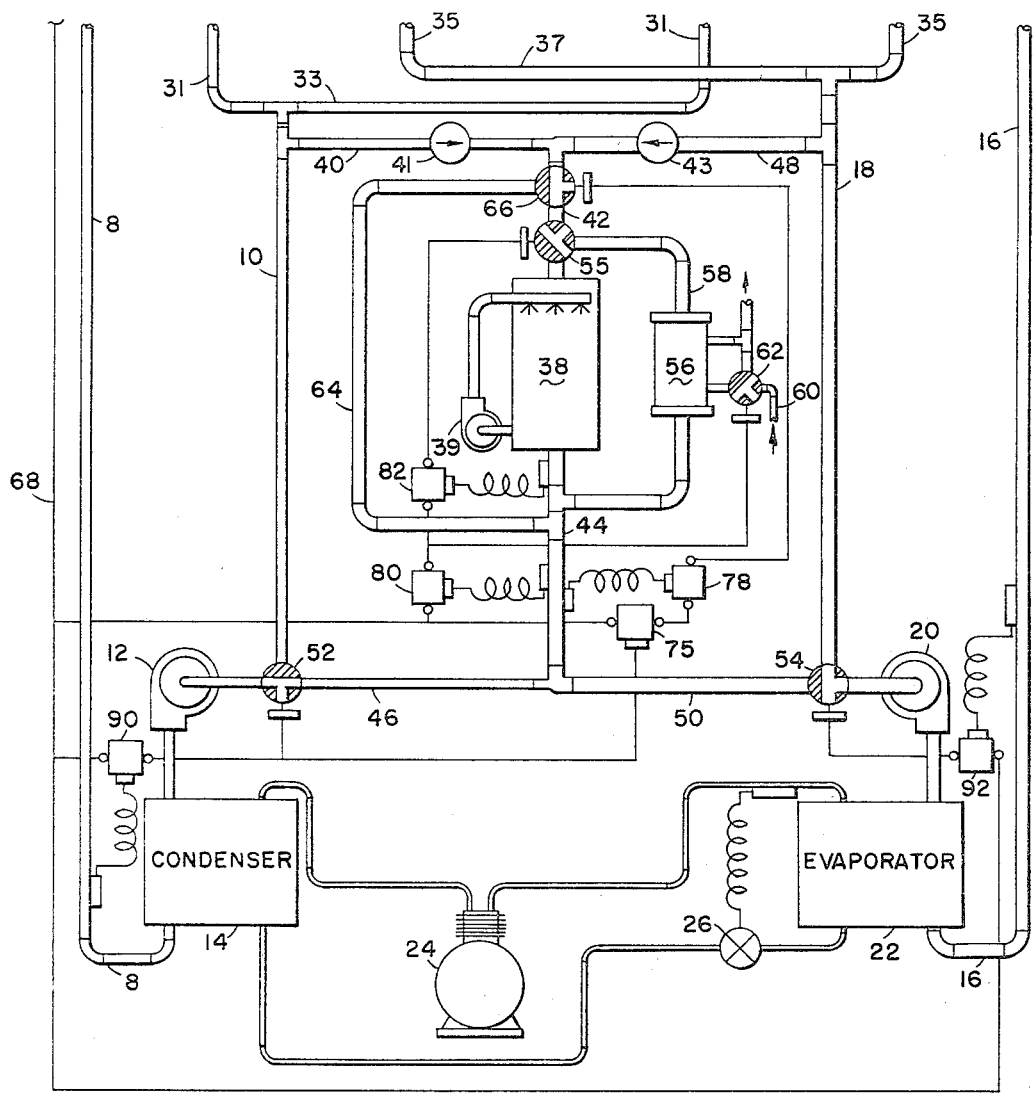
FIGURE 2 is a diagrammatic illustration of a modified control arrangement for the heating and cooling apparatus of FIGURE 1.

On many installations the outside temperature is not the determinative factor for changing from heating (winter) to cooling (summer) operation, and vice-versa. Internal loads in certain zones or the orientation and shading of the building may be such that the outside temperature has little effect on whether the greatest portion of the load on the air conditioning system is heating or cooling. When this is the case, a more sophisticated control arrangement as shown in FIGURE 2 may be employed. The basic arrangement of the heating and cooling apparatus would therefore remain the same and like reference numerals have therefore been used to designate like elements of FIGURE 1. The variation in the control arrangement lies in the particular means for regulating the positions of valve 52 and 54. Rather than positioning these valves in accordance with the outdoor temperature, controls are provided to actuate them in response to a change in the cooling or heating load as reflected by changes in the temperatures of the fluids circulating in the heating and cooling circuits. These controls take the form of temperature controller 90 having its sensing bulb located in the heating fluid supply line leading from condenser 14, and temperature controller 92 positioned to sense the temperature of the cooling fluid leaving evaporator 22. Controller 90 is set to maintain a constant temperature, for example 120° F., of the heating fluid at the outlet of the condenser, and controller 92 has a set point of approximately 45° F. for the cooling fluid at the evaporator outlet. In operation, a predominantly high heating load would cause the temperature of the heating fluid downstream of the condenser to decrease below the set point of controller 90 if the heating fluid is giving up heat in both coils 4 of the condition zones and in the evaporative cooler 38. When this condition is reached, reverse acting controller 90 will pass more high pressure air so as to actuate valve 52 to a position permitting all of the heating fluid returning through pipes 31 and 33 to bypass evaporative cooler 38 and return directly to condenser 14 through return pipe 10. At the same time, the temperature of the cooling fluid leaving evaporator 22 may start decreasing due to the existence of a minimum cooling load in zones 1 and 2. When this happens, direct acting controller 92 will decrease the control air pressure acting on valve 54 whereby this valve will assume a position permitting flow through both pipes 50 and 18 to pump 20. Thus some of the fluid in the cooling circuit will flow through the evaporative cooler to pick up heat and the rest will return directly to evaporator 22.

When the cooling load is larger, as indicated by an excessively high temperature in supply line 16 downstream of evaporator 22, controller 92 will position valve 54 so as to route all of the fluid in the cooling circuit directly back to evaporator 22 through return line 18. Concurrently, the light heating load will cause most of the heating fluid to bypass heating coils 4. Having given up very little of the condenser heat in the conditioned spaces, the heating fluid will be returning to condenser 14 at such a high temperature that the temperature in pipe 8 downstream of condenser 14 will rise above the desired level. Controller 90 will sense this condition and change the setting of valve 52 so that at least a portion of the heating fluid passes through evaporative cooler 38 to be cooled. At the same time that some of the fluid from the heating circuit starts flowing through evaporative cooler 38 temperature controller 78 must be activated in order that the temperature of the heating fluid at the outlet of the evaporative cooler may be properly regulated. This is accomplished by means of two position relay 75 in the air line leading to controller 78. Relay 75 is also regulated by temperature controller 90, as is clearly indicated in FIGURE 2. According to this arrangement, controller 90 actuates relay 75 to the position permitting the flow of control air to controller 78 simultaneously with the positioning of valve 52 to communicate the outlet of evaporative cooler 38 with pump 12.

In this arrangement, therefore, control valves 52 and 54 are the modulating type rather than the two-position type as is the case in the control system of FIGURE 1. However, when valve 52 is modulating the flow of heating fluid with a portion thereof passing through evaporative cooler 38, valve 54 will be in a position to direct all of the cooling fluid directly to pump 20 through return pipe 18, and vice versa. Thus, there is no possibility of the heating and cooling fluids mixing in evaporative cooler 38.

Figure 3:
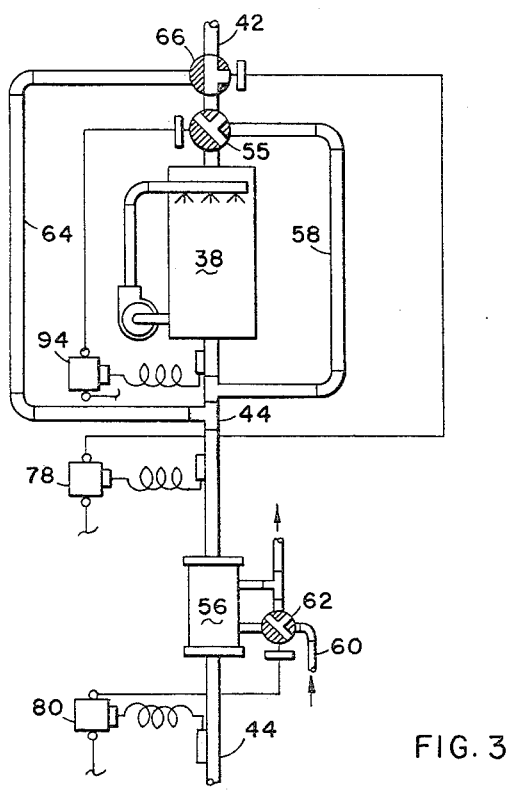
FIGURE 3 is a variation of the arrangement shown in FIGURE 1 showing an auxiliary heater serving as a supplemental heat source during winter operation connected in series with the outdoor heat exchanger.

FIGURE 3 illustrates another variation of the basic air conditioning apparatus of FIGURE 1 wherein supplemental heater 56 is connected in series rather than in parallel with outdoor heat exchanger 38. Only the piping and controls for heat exchanger 38 and heater 56 are shown, as the rest of the system remains the same. As with the arrangement shown in FIGURE 1, bypass line 58 is positioned in parallel with heat exchanger 38, and flow of cooling fluid therethrough is controlled by valve 55 in inlet pipe 42. Valve 55 is now actuated by a separate controller 94 which changes the position of valve 55 in response to variations in the temperature of the cooling fluid stream leaving heat exchanger 38. A second by pass pipe 64 controlled by valve 66 in inlet pipe 42 is also provided as before. Temperature comptroller 78 operates in the same manner as described above with respect to FIGURE 1 to actuate valve 66 to a position directing fluid from the heating circuit through bypass 64 when the temperature of the fluid leaving heat exchanger 38 reaches an undesirably low level during summer or cooling cycle operation. Temperature controller 80 now regulates only valve 62 in hot water supply line 60 to put more or less heat into supplemental heater 56 in response to changes in the temperature of the cooling fluid passing through outlet pipe 44. If, during the winter or heating season, a low outdoor temperature causes the temperature of the cooling fluid downstream of heat exchanger 38 to drop below the set point of controller 94, valve 55 will be actuated to direct more and more of the cooling fluid through bypass line 58. At the same time, the substantially unheated condition of the cooling fluid in outlet pipe 44 will be sensed by controller 80, which will position valve 62 to direct an increased amount of hot water through heater 56.

While heating and cooling coils 4 and 6 have been described as forming portions of individual conditioning units located in each zone, it is to be noted that these coils could just as well be located in the hot and cold decks of a central station air conditioning unit of a so-called double duct system. As is indicated in U.S. Patent No. 2,894,728, such systems normally utilize a central air handling unit having heating and cooling coils positioned in the hot air and cold air supply ducts leading to zones to be conditioned.

The above described heating and cooling apparatus affords an exceedingly uncomplicated and economical means for continuously providing heating and cooling in a plurality of zones. The four pipe arrangement of our invention is economical to install and operate because of the unique manner in which a standard compression refrigeration cycle is employed to continuously heat and cool the fluids circulated through heating and cooling coils in the conditioned spaces. Not only is it unnecessary to provide means for reversing the refrigerant flow as is normally done in heat pump systems, but also the heat exchanger which ordinarily serves to dissipate the heat from a water cooled refrigerant condenser also functions in a dual role to act as both a heat source and heat sink. This effective utilization of an evaporative cooler, or a heat exchanger employing a fluid such as well water, is made possible by the particular piping and control arrangement which we have shown and described above. Moreover, the utilization of auxiliary heater 56 in the manner shown permits supplemental heat to be added as needed for winter time heat pump operation at a single point in the system. This offers obvious first cost and operating cost advantages in comparison with those heat pump systems which must rely upon supplemental electric heaters as a part of the conditioning units in each zone.

We have described our invention with respect to the particular embodiments shown in the drawings for illustrative purposes only. It is contemplated that various modifications will occur to those skilled in the art which will be within the spirit and scope of our invention as defined by the following claims.

We claim:

1. Heating and cooling apparatus comprising: a compressor, condenser, expansion means and an evaporator interconnected in refrigerant flow relationship; a heating circuit comprising first heat transfer means connected in fluid flow relationship with said condenser, and means for circulating a heating medium through said condenser and said first heat transfer means; a cooling circuit comprising second heat transfer means connected in fluid flow relationship with said evaporator, and means for circulating a cooling medium through said evapoartor and said second heat transfer means; a heat exchanger exposed to outdoor air; and fluid passage means constructed and arranged to alternately connect said heat exchanger in either said heating circuit downstream of said first heat transfer means or in said cooling circuit downstream of said second heat transfer means.

2. Heating and cooling apparatus comprising: a refrigeration circuit comprising a compressor, condenser, expansion means and an evaporator interconnected in refrigerant flow relationship; first heat transfer means connected in fluid flow relationship with said condenser, and first piping means arranged to circulate a heating fluid between said condenser and said first heat transfer means at all times; second heat transfer means connected in fluid flow relationship with said evaporator and second piping means arranged to circulate a cooling fluid between said evaporator and said second heat transfer means at all times; a heat exchanger which serves alternately as the sole heat source and heat sink for said refrigeration circuit; and fluid passage means constructed and arranged to alternately connect said heat exchanger to either said first piping means or said second piping means.

3. Apparatus as defined in claim 1 wherein said first and second heat transfer means comprise a plurality of heating coils and a plurality of cooling coils respectively, one each of said heating coils and said cooling coils being located in each of a plurality of zones to be conditioned.

4. Apparatus as defined in claim 2 wherein said fluid passage means comprises first conduit means connecting the inlet of said heat exchanger with said first piping means downstream of said first heat transfer means with respect to the direction of heating fluid flow; second conduit means connecting the outlet of said heat exchanger to said first piping means; third conduit means connecting the inlet of said heat exchanger with said second piping means downstream of said second heat transfer means with respect to the direction of cooling fluid flow; and fourth conduit means connecting the outlet of said heat exchanger to said second piping means.

5. Apparatus as defined in claim 4 and further including a check valve in both said first conduit means and said second conduit means, a first three-way valve at the point of connection of said second conduit means to said first piping means, and a second three-way valve at the point of connection of said fourth conduit means to said second piping means, said first and second three-way valves being operable between a first position directing the flow of said heating fluid through said first conduit means, said heat exchanger and said first piping means, and a second position directing the flow of said cooling fluid through said third conduit means, said heat exchanger and said second piping means.

6. Apparatus as defined in claim 2 wherein said first and second heat transfer means comprise a plurality of heating coils and a plurality of cooling coils respectively, one of said heating coils and one of said cooling coils being located in each of a plurality of zones to be air conditioned.

7. Apparatus as defined in claim 2 wherein said heat exchanger is an evaporative cooler exposed to outdoor air, and further including a bypass conduit around said heat exchanger; a supplemental heater and means for supplying heat thereto; means for conducting said cooling fluid through said supplemental heater; and valve means connected to said heat exchanger and said bypass conduit, said valve means being operative to control the proportions of said cooling fluid flowing through said heat exchanger and said bypass conduit.

8. Apparatus as defined in claim 7 wherein said supplemental heater is located in said bypass conduit whereby said bypass conduit constitutes said means for conducting said cooling fluid through said supplemental heater.

9. Apparatus as defined in claim 8 and further including thermostat means responsive to the temperature of said cooling fluid and operatively associated with both said means for supplying heat to said supplemental heater and said valve means.

10. Heating and cooling apparatus comprising: a refrigeration plant comprising a compressor, condenser, expansion means and an evaporator interconnected in refrigerant flow relationship; a heating circuit comprising first heat transfer means connected to said condenser by a first set of supply and return pipes, and means for circulating a heating fluid through said heating circuit; a cooling circuit comprising second heat transfer means connected to said evaporator by a second set of supply and return pipes, and means for circulating a cooling fluid through said cooling circuit; a heat exchanger which serves alternately as the heat source and heat sink for said refrigeration plant; fluid passage means constructed and arranged to selectively conduct either said heating fluid or said cooling fluid through said heat exchanger, said fluid passage means including first valve means selectively operable to direct said heating fluid either through said heat exchanger or continuously within said heating circuit, and second valve means selectively operable to direct said cooling fluid either through said heat exchanger or continuously within said cooling circuit; a first temperature controller arranged to actuate said first valve means in response to variations in the temperature of said heating fluid; and a second temperature controller arranged to actuate said second valve means in response to variations in the temperature of said cooling fluid.

References Cited

UNITED STATES PATENTS

| | | | |
|---|---|---|---|
| 2,796,743 | 6/1957 | McFarlan | 62—510 XR |
| 2,797,068 | 6/1957 | McFarlan | 62—159 XR |
| 2,984,458 | 5/1961 | McFarlan | 165—22 |
| 2,893,218 | 7/1959 | Harnish | 62—435 XR |
| 3,024,008 | 3/1962 | Blum | 165—22 |
| 3,127,929 | 4/1964 | Ringquist | 165—50 XR |
| 3,130,557 | 4/1964 | McFarlan | 62—305 XR |
| 3,165,148 | 1/1965 | Soule | 165—29 |

ROBERT A. O'LEARY, *Primary Examiner.*

M. A. ANTONAKAS, *Assistant Examiner.*